(12) United States Patent
Hirota et al.

(10) Patent No.: US 11,117,785 B2
(45) Date of Patent: Sep. 14, 2021

(54) WIRE ROPE FLAW DETECTOR

(71) Applicant: Mitsubishi Electric Corporation, Tokyo (JP)

(72) Inventors: Kazuaki Hirota, Tokyo (JP); Takashi Yoshioka, Tokyo (JP); Fumitake Takahashi, Tokyo (JP); Tetsuroh Seki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 27 days.

(21) Appl. No.: 16/465,419

(22) PCT Filed: Oct. 2, 2017

(86) PCT No.: PCT/JP2017/035871
§ 371 (c)(1),
(2) Date: May 30, 2019

(87) PCT Pub. No.: WO2018/110039
PCT Pub. Date: Jun. 21, 2018

(65) Prior Publication Data
US 2020/0002133 A1     Jan. 2, 2020

(30) Foreign Application Priority Data

Dec. 13, 2016 (JP) .............................. JP2016-241072

(51) Int. Cl.
*B66B 7/12* (2006.01)
*G01N 27/83* (2006.01)
(Continued)

(52) U.S. Cl.
CPC .............. *B66B 7/123* (2013.01); *B66C 15/00* (2013.01); *B66C 23/88* (2013.01); *B66D 1/54* (2013.01); *G01N 27/83* (2013.01)

(58) Field of Classification Search
CPC .......... B66B 7/123; B66C 15/00; B66C 23/88; B66D 1/54; G01N 27/83
See application file for complete search history.

(56) References Cited

U.S. PATENT DOCUMENTS 5,821,430 A * 10/1998 Kwun ..................... B66B 7/123
73/862.41
2010/0019762 A1* 1/2010 Furusawa .............. G01N 27/83
324/240
(Continued)

FOREIGN PATENT DOCUMENTS

JP        S53-039019 U     4/1978
JP        2010256110 A    11/2010
(Continued)

OTHER PUBLICATIONS

Office Action dated Oct. 15, 2019, issued in corresponding Japanese Patent Application No. 2018-556203, 8 pages including 4 pages of English translation.
(Continued)

*Primary Examiner* — Christopher P McAndrew
*Assistant Examiner* — Zannatul Ferdous
(74) *Attorney, Agent, or Firm* — Buchanan Ingersoll & Rooney PC (57) ABSTRACT

Provided is a wire rope flaw detector according to the present invention includes a magnetizer configured to form a magnetic path in a predetermined segment of a wire rope, a magnetic sensor configured to detect a leakage magnetic flux generated from the wire rope, and a protective cover configured to prevent the wire rope from being brought into contact with the magnetic sensor. The wire rope flaw detector further includes a magnetic sensor protecting member configured to prevent the protective cover from being brought into contact with an upper face of the magnetic
(Continued)

sensor so as to prevent application of a pressure equal to or larger than a predetermined pressure to the magnetic sensor.

20 Claims, 6 Drawing Sheets

(51) Int. Cl.
*B66D 1/54* (2006.01)
*B66C 15/00* (2006.01)
*B66C 23/88* (2006.01)

(56) References Cited

U.S. PATENT DOCUMENTS

| | | | |
|---|---|---|---|
| 2014/0035569 A1* | 2/2014 | Yoshioka | G01N 27/82 |
| | | | 324/242 |
| 2017/0023347 A1* | 1/2017 | Ouellette | G01N 27/9026 |
| 2017/0038338 A1* | 2/2017 | Kondoh | G01N 27/83 |
| 2017/0057136 A1* | 3/2017 | Fukuda | B29C 45/14311 |
| 2019/0079053 A1* | 3/2019 | Hirota | G01N 27/83 |

FOREIGN PATENT DOCUMENTS

| | | |
|---|---|---|
| JP | 5574809 B2 | 7/2014 |
| KR | 20100004933 A | 1/2010 |
| WO | 2008093410 A1 | 8/2008 |
| WO | 2016174703 A1 | 11/2016 |
| WO | 2017029977 A1 | 2/2017 |
| WO | 2017163362 A1 | 9/2017 |

OTHER PUBLICATIONS

International Search Report (PCT/ISA/210) dated Nov. 28, 2017, by the Japan Patent Office as the International Searching Authority for International Application No. PCT/JP2017/035871.

Written Opinion (PCT/ISA/237) dated Nov. 28, 2017, by the Japan Patent Office as the International Searching Authority for International Application No. PCT/JP2017/035871.

Notification of Reason for Refusal dated May 6, 2020, issued in corresponding Korean Patent Application No. 10-2019-7015930, 10 pages including 5 pages of English translation.

* cited by examiner

WIRE ROPE FLAW DETECTOR

TECHNICAL FIELD

The present invention relates to a wire rope flaw detector configured to detect damage of a rope such as a wire rope to be used for, for example, an elevator, a hoist, and a crane.

BACKGROUND ART

As a related-art wire rope flaw detector, there is exemplified a wire rope flaw detector including magnetizing means, a magnetic sensor, and a cover (see, for example, Patent Literature 1). The magnetizing means is configured to magnetize a wire rope in an axial direction of the wire rope. The magnetic sensor is arranged in the vicinity of a part of the wire rope, which is to be magnetized by the magnetizing means, and is configured to detect a leakage magnetic flux leaking from a damaged portion formed in the part of the wire rope. The cover is configured to protect the magnetic sensor from the wire rope.

CITATION LIST

Patent Literature

[PTL 1] JP 5574809 B2

SUMMARY OF INVENTION

Technical Problem

The above-mentioned related-art wire rope flaw detector, which includes the magnetizing means, the magnetic sensor, and the cover, can detect a disconnected part of the wire rope passing therethrough. In order to improve disconnection detection accuracy, however, the magnetizing means is required to generate a sufficient magnetic flux to magnetically saturate the wire rope passing therethrough. At the same time, the magnetic sensor is required to be arranged as close as possible to the wire rope.

In a case in which the wire rope is not magnetically saturated, even when the wire rope has the disconnected part, the leakage magnetic flux generated from the wire rope is small. As a result, it becomes difficult to reliably detect the disconnected part with use of the magnetic sensor.

Thus, the magnetizing means is required to generate a sufficient magnetic flux to magnetically saturate the wire rope. As a result, a large magnetic force is generated between the wire rope and the magnetizing means. A magnetic flux amount that is required for saturating the wire rope is proportional to a sectional area of the wire rope. Therefore, the magnetic force tends to increase in proportional to the square of a diameter of the wire rope.

The magnetic flux that leaks from the wire rope decreases in a direction away from the wire rope. Therefore, when a position of the wire rope and a position of the magnetic sensor are away from each other, it becomes difficult to detect the leakage magnetic flux with use of the magnetic sensor. Thus, the magnetic sensor is required to be arranged as close as possible to the wire rope. Therefore, a protective cover, which is provided so as to be located between the wire rope and the magnetic sensor, is demanded to have a reduced thickness.

When the diameter of the wire rope is large and the magnetic force between the wire rope and the magnetic sensor is large, however, a contact pressure between the wire rope and the protective cover increases. Therefore, the protective cover is demanded to have a high strength. In order to ensure the strength of the protective cover, the thickness of the protective cover is inevitably required to be increased. As a result, there arises a problem in that a distance between the wire rope and the magnetic sensor is undesirably increased to decrease disconnection detection accuracy.

There is also conceivable a method in which the thickness of the protective cover is not increased so as to give a higher importance to the disconnection detection accuracy. With the method described above, however, the protective cover does not have a sufficient strength. Therefore, there arises a problem in that the protective cover is deformed by a force received from the wire rope to press the magnetic sensor to result in breakage of the magnetic sensor. In particular, when the magnetic sensor is formed of a coil, a copper wire used to form the coil may be pressed flat by the protective cover to cause disconnection.

In order to prevent the decrease in disconnection detection accuracy and the breakage of the magnetic sensor, there is also conceivable a method of using a harder material for the protective cover or a method of providing a coating on a contact face of the protective cover, which is to be brought into contact with the wire rope, to decrease a friction coefficient with the wire rope. When the contact face of the protective cover, which is to be brought into contact with the wire rope, has a higher hardness than that of a face layer of the wire rope, there arises a problem in that wear of the wire rope is accelerated to reduce a lifetime of the wire rope itself.

To cope with the problem described above, there is conceivable a method of providing a coating, which is softer than the wire rope, on the contact face of the protective cover, which is to be brought into contact with the wire rope. In this case, however, there arises a problem in that the coating peels off while the wire rope is running.

The present invention has been made to solve the problems described above, and has an object to provide a wire rope flaw detector having an excellent durability while maintaining disconnection detection accuracy and a lifetime of a wire rope.

Solution to Problem

According to one embodiment of the present invention, there is provided a wire rope flaw detector configured to detect damage of a wire rope, including: a magnetizer configured to form a magnetic path in a predetermined segment of the wire rope; a magnetic sensor, which is arranged so as to be magnetically insulated from the magnetizer, and is configured to detect a leakage magnetic flux generated in the wire rope based on the magnetic path; and a protective cover, which is provided between the magnetic sensor and the wire rope, has a groove for allowing the wire rope to pass therethrough, and has one face that is located on a side opposite to another face on a side on which the wire rope passes, the one face having a part maintained at such a position that the part of the one face is opposed to an upper face of the magnetic sensor, the wire rope flaw detector further including: a magnetic sensor protecting member configured to prevent the protective cover from being brought into contact with the upper face of the magnetic sensor so as to prevent application of a pressure equal to or larger than a predetermined pressure to the magnetic sensor.

Advantageous Effects of Invention

According to one embodiment of the present invention, the wire rope flaw detector further includes the magnetic sensor protecting member as a configuration capable of reducing a force of the protective cover to press the magnetic sensor even when the protective cover is deformed by a contact pressure received from the wire rope or vibration of the wire rope itself. As a result, the wire rope flaw detector having an excellent durability can be provided while the disconnection detection accuracy and the lifetime of the wire rope are maintained.

DESCRIPTION OF EMBODIMENTS

Now, exemplary embodiments of a wire rope flaw detector according to the present invention are described with reference to the drawings. The wire rope flaw detector according to the present invention includes a magnetizer, a magnetic sensor, and a protective cover. The wire rope flaw detector further includes magnetic sensor protecting members as a technical feature. Each of the magnetic sensor protecting members is configured to support the protective cover so that a distance between a lower face of the protective cover and an upper face of the magnetic sensor, which are opposed to each other, becomes 0 or larger under a state in which the protective cover is not deformed in a radial direction and reduce a force of the lower face of the protective cover to press the upper face of the magnetic sensor under a state in which the protective cover is deformed in the radial direction. Specifically, the wire rope flaw detector according to the present invention further includes, as a technical feature, the magnetic sensor protecting members configured to prevent the protective cover from being brought into contact with the upper face of the magnetic sensor so as to prevent application of a pressure equal to or larger than a predetermined pressure to the magnetic sensor.

First Embodiment

Figure 1:
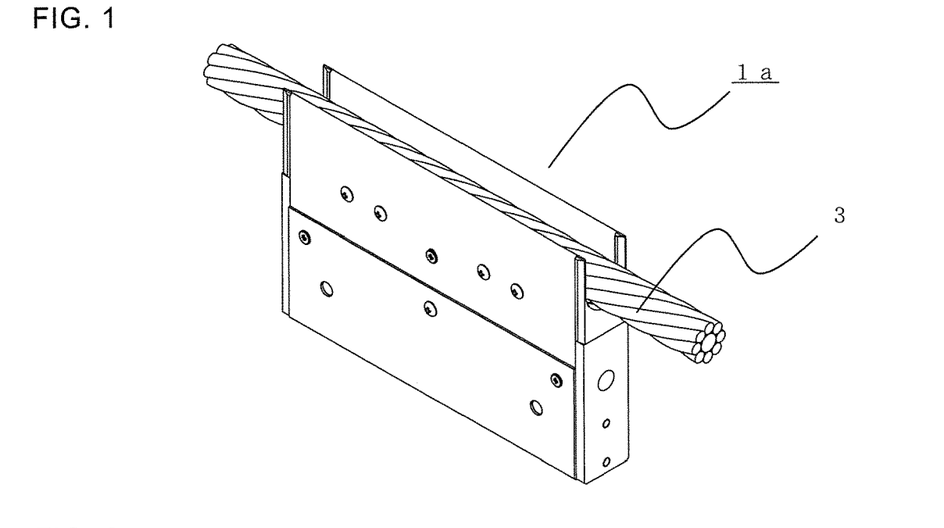
FIG. 1 is a perspective view for illustrating a state in which a wire rope flaw detector according to a first embodiment of the present invention is installed so that a wire rope is placed therein.
Figure 2:
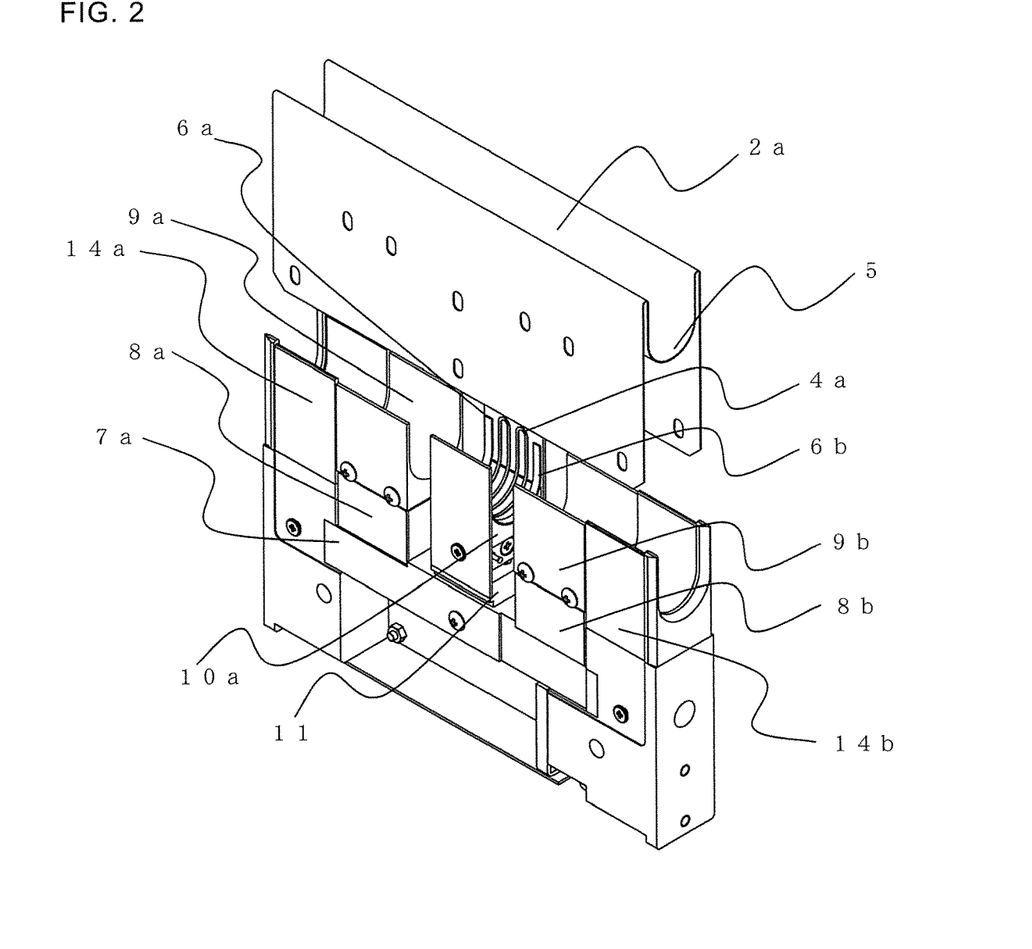
FIG. 2 is a perspective view for illustrating a state in which a protective cover of the wire rope flaw detector of FIG. 1 according to the first embodiment of the present invention is removed.

FIG. 1 is a perspective view for illustrating a state in which a wire rope flaw detector 1a according to a first embodiment of the present invention is installed so that a wire rope 3 is placed therein. FIG. 2 is a perspective view for illustrating a state in which a protective cover 2a of the wire rope flaw detector 1a of FIG. 1 according to the first embodiment of the present invention is removed.

The wire rope flaw detector 1a includes a magnetizer and a magnetic sensor 4a. The magnetizer is configured to form a main magnetic path in a predetermined segment of a wire rope 3 that is running. The predetermined segment corresponds to a running interval that is defined in advance in an axial direction of the wire rope 3. The magnetic sensor 4a is configured to detect a leakage magnetic flux generated because of the presence of a damaged portion of the wire rope 3.

The wire rope flaw detector 1a includes a protective cover 2a having a U-shaped guide groove 5 for allowing the wire rope 3 to run therethrough. Further, the wire rope flaw detector 1a includes magnetic sensor protecting members 6a and 6b configured to protect the magnetic sensor 4a from being pressed by the protective cover 2a.

The magnetizer of the wire rope flaw detector 1a is configured to form the main magnetic path in the predetermined segment of the wire rope 3 in the axial direction. More specifically, the magnetizer includes a back yoke 7a, a pair of excitation permanent magnets 8a and 8b, and magnetic-pole pieces 9a and 9b. The back yoke 7a is made of a ferromagnetic substance such as iron. The excitation permanent magnets 8a and 8b are arranged on both ends of the back yoke 7a so as to have opposite polarities. The magnetic-pole piece 9a made of a ferromagnetic substance is arranged on one of magnetic-pole faces of the permanent magnets 8a and 8b, which is located on the side opposite to the magnetic-pole face with which the back yoke 7a is arranged so as to be held in contact. Similarly, the magnetic-pole piece 9b made of the ferromagnetic substance is arranged on one of magnetic-pole faces of the permanent magnet 8b, which is located on the side opposite to the magnetic-pole face with which the back yoke 7a is arranged so as to be held in contact.

Electromagnets can be used in place of the permanent magnets 8a and 8b. Each of the magnetic-pole pieces 9a and 9b has a U-like shape so that an upper part thereof is formed in conformity with a curvature of an outer periphery of the wire rope 3.

The magnetic sensor 4a configured to detect the leakage magnetic flux is formed mainly of a coil or a Hall element, and is assembled onto a support base 10a. The support base 10a is connected to the back yoke 7a through intermediation of a non-magnetic material part 11 so as to be magnetically insulated from a main magnetic path formed through the back yoke 7a, the permanent magnets 8a and 8b, and the magnetic-pole pieces 9a and 9b.

Any one of a ferromagnetic substance and a non-magnetic substance may be used as a material of the support base 10a. In order to prevent a magnetic flux excluding the leakage magnetic flux generated from the wire rope 3 from being mixed into the magnetic sensor 4a, the ferromagnetic substance is more desirable as the material of the support base 10a.

Even when each of the magnetic sensor 4a and the support base 10a is formed into a flat shape and a face of the magnetic sensor 4a is arranged so as to be oriented to a center of the wire rope 3, the leakage magnetic flux can be detected. When each of the magnetic sensor 4a and the support base 10a is formed into the same U-like shape as the U-like shape of each of the magnetic-pole pieces 9a and 9b as illustrated in FIG. 2, however, the magnetic sensor 4a can be arranged so as to be located in proximity to the wire rope 3 over a larger range. As a result, a disconnection detectable range can be enlarged.

In order to prevent electric leakage from the magnetic sensor 4a toward the support base 10a, an insulation coating is desired to be provided on a face of the support base 10a.

Figure 3:
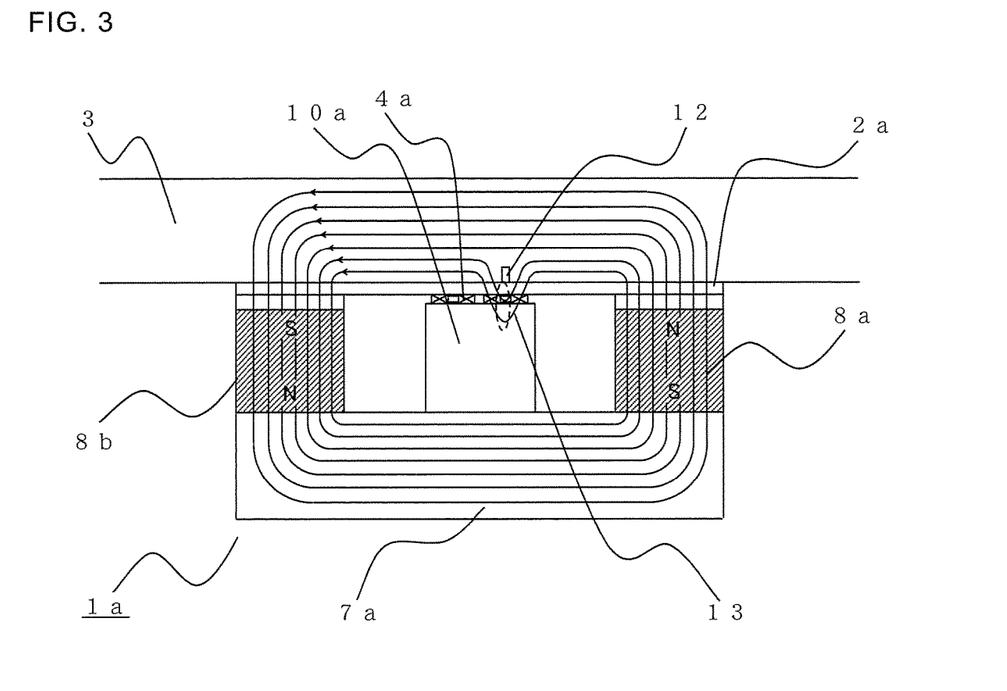
FIG. 3 is a schematic sectional view of the wire rope flaw detector according to the first embodiment of the present invention.

FIG. 3 is a schematic sectional view of the wire rope flaw detector 1a according to the first embodiment of the present invention. More specifically, FIG. 3 is an illustration of a state of flow of magnetic fluxes when a wire rope damaged portion 12 passes through the vicinity of the magnetic sensor 4a. As illustrated in FIG. 3, a main magnetic flux generated from the permanent magnet 8a passes through the wire rope 3 and the back yoke 7a via the permanent magnet 8b, and returns to the permanent magnet 8a.

A local leakage magnetic flux 13 generated from the vicinity of the wire rope damaged portion 12 passes through the non-magnetic protective cover 2a, the magnetic sensor 4a, and the support base 10a, and then returns to the wire rope 3, as illustrated in FIG. 3.

Figure 4A:
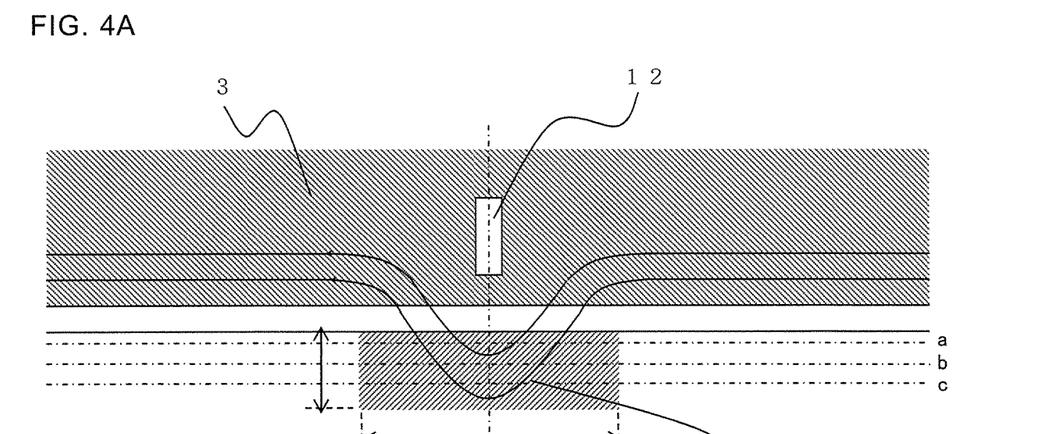
FIGS. 4A and 4B are enlarged views for illustrating flow of a local leakage magnetic flux illustrated in FIG. 3 and a flux density distribution chart in the first embodiment of the present invention.
Figure 4B:
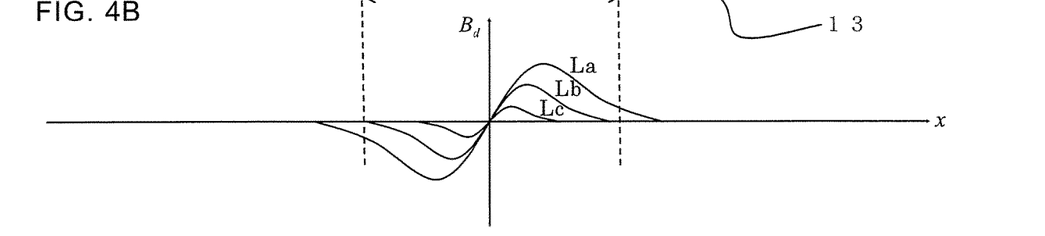

FIG. 4 are an enlarged view for illustrating flow of the local leakage magnetic flux 13 illustrated in FIG. 3 and a flux density distribution chart in the first embodiment of the present invention. More specifically, FIG. 4A is an enlarged view for illustrating a positional relationship between three positions a, b, and c outside the wire rope 3 and the local leakage magnetic flux 13, and FIG. 4B is a chart for showing a distribution of a flux density $B_d$ in a radial direction of the wire rope at the positions a, b, and c.

The local leakage magnetic flux 13, which flows to the outside of the wire rope 3, is liable to return to the wire rope 3 through a possible shortest magnetic path. Therefore, a region outside the wire rope 3, in which the local leakage magnetic flux 13 distributes, is small. Curves La, Lb, and Lc in FIG. 4B represent flux density distributions in the radial direction of the wire rope at the positions a, b, and c indicated by the alternate long and short dash lines in FIG. 4A, respectively.

The distribution of the flux density becomes smaller as the position is separated away from the wire rope damaged portion 12 as a starting point in the axial direction of the wire rope and the radial direction of the wire rope. Based on the flux density distribution described above, it is understood that, when a distance between the wire rope and the magnetic sensor 4a increases, the flux density is decreased to reduce an intensity of a signal to be detected.

The wire rope 3 is required to be internally magnetically saturated so that the local leakage magnetic flux 13 is generated from the wire rope damaged portion 12. The reason is as follows. When the wire rope 3 is not internally magnetically saturated, the magnetic flux does not leak from the wire rope 3 even under the presence of the wire rope damaged portion 12 and only passes through a portion inside the wire rope 3, in which the flux density is relatively low.

A magnetic flux amount that is required for magnetically saturating the wire rope 3 is generally proportional to a sectional area of the wire rope 3. Therefore, the magnetic flux amount that is required for magnetically saturating the wire rope 3 is proportional to the square of a diameter of the wire rope. Thus, when the wire rope flaw detector detects the wire rope 3 having a larger diameter, which is a target to be measured, outputs of the permanent magnets 8a and 8b are required to be increased. An intensity of a force to attract the wire rope 3 to the wire rope flaw detector tends to increase.

The protective cover 2a of FIG. 1 and FIG. 2 is made of a non-magnetic material such as aluminum, austenite-based stainless steel, brass, or a resin, which has a lower hardness than that of a face layer of the wire rope 3, so as not to accelerate abrasion of the wire rope 3. The protective cover 2a is arranged so as to have a given gap from U-shaped portions of the magnetic sensor 4a and the magnetic-pole pieces 9a and 9b, and fulfills a function of protecting the magnetic sensor 4a and the magnetic-pole pieces 9a and 9b.

As described above, when the distance between the wire rope 3 and the magnetic sensor 4a increases, disconnection detection accuracy is decreased. Therefore, it is desired that the protective cover 2a that is provided so as to be located between the wire rope 3 and the magnetic sensor 4a have a thickness as small as possible. In a case in which the protective cover 2a has a small thickness, however, when the force to attract the wire rope 3 to the wire rope flaw detector is large, the protective cover 2a is sometimes deformed because of an insufficient strength.

As measures against the deformation, the magnetic sensor protecting members 6a and 6b are provided in the first embodiment as described later. Besides the provision of the magnetic sensor protecting members 6a and 6b described above, an abrasion resistance of the protective cover 2a can be improved to prolong a lifetime by coating or plating a contact face of the protective cover 2a, which is to be brought into contact with the wire rope 3, with diamond-like carbon (DLC), a fluororesin, or electroless nickel.

When a material of the coating or the plating on the protective cover 2a is harder than the face layer of the wire rope 3, the abrasion of the wire rope 3 may be accelerated to bring about a reduction in lifetime of the wire rope 3. Further, the coating or the plating, which contains a magnetic substance such as electroless nickel, may reduce the leakage magnetic flux passing through the magnetic sensor 4a to bring about a decrease in disconnection detection accuracy. Therefore, caution is required to use the above-mentioned coating or plating containing the magnetic substance.

As is apparent from the perspective view of FIG. 2, both ends of the protective cover 2 are bonded or welded to guide blocks 14a and 14b, respectively, to fix the protective cover 2a. The guide blocks 14a and 14b are made of a non-magnetic material so as not to affect the magnetizer, and are fixed to both ends of the back yoke 7a.

Figure 5:
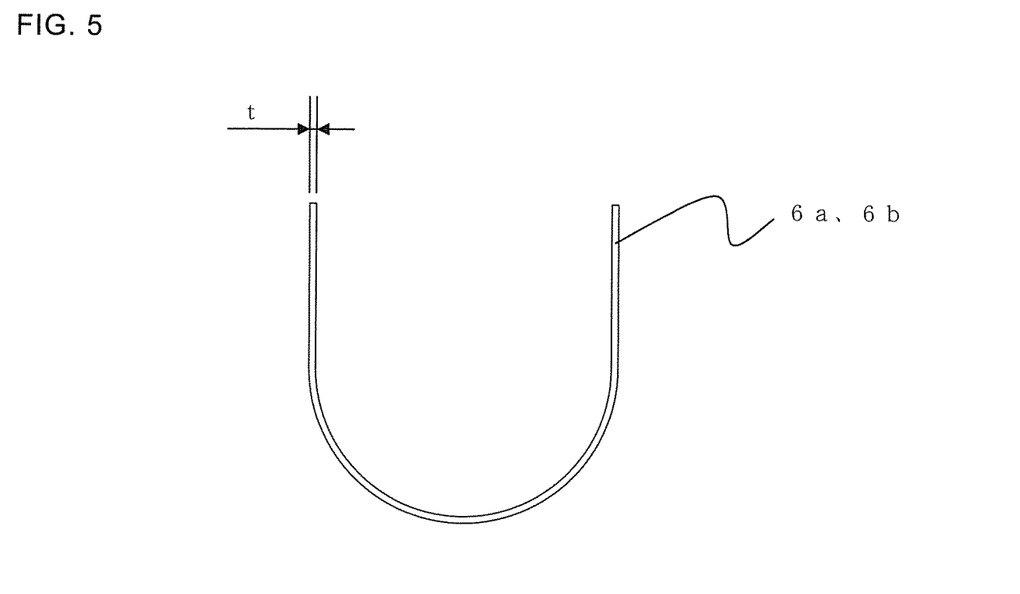
FIG. 5 is a front view of a magnetic sensor protecting member alone according to the first embodiment of the present invention.

FIG. 5 is a front view of the magnetic sensor protecting member 6a, 6b alone according to the first embodiment of the present invention. The magnetic sensor protecting members 6a and 6b are made of a non-magnetic metal material such as aluminum, austenite-based stainless steel, or brass. The magnetic sensor protecting members 6a and 6b are each processed into a U-like shape, and are arranged on both ends of the support base 10a so as to sandwich the magnetic sensor 4a therebetween, as illustrated in FIG. 2 referred to above.

A dimension in the radial direction of the wire rope, which is indicated by the reference symbol "t" in FIG. 5, specifically, a difference between an inner diameter and an outer diameter of the U-shaped portion is defined as a thickness dimension. In this case, the thickness t of each of the magnetic sensor protecting members 6a and 6b is set equal to or larger than a thickness of the magnetic sensor 4. When the support base 10a is made of a non-magnetic material, the magnetic sensor protecting members 6a and 6b and the support base 10a may be formed to have an integral structure.

Figure 6:
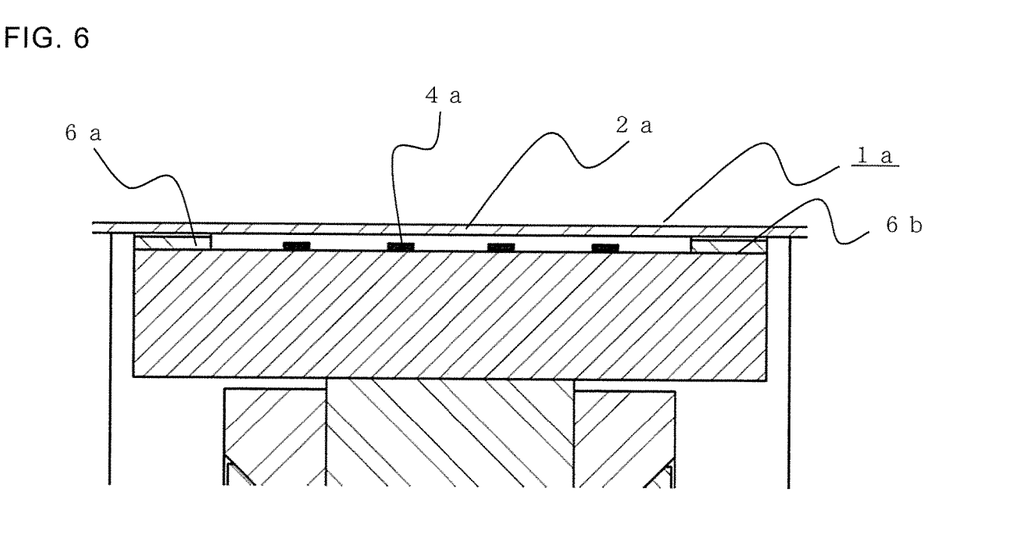
FIG. 6 is a sectional view of a magnetic sensor and the periphery thereof of the wire rope flaw detector according to the first embodiment of the present invention.

FIG. 6 is a sectional view of the magnetic sensor 4a and the periphery thereof of the wire rope flaw detector 1a according to the first embodiment of the present invention. The thickness t of each of the magnetic sensor protecting members 6a and 6b is larger than or equal to the thickness of the magnetic sensor 4a. Therefore, a clearance between the protective cover 2a and each of the magnetic sensor protecting members 6a and 6b is smaller than or equal to a clearance between the protective cover 2a and the magnetic sensor 4a.

As described above, in the first embodiment, the wire rope flaw detector 1a includes the magnetizer, which includes the back yoke 7a, the permanent magnets 8a and 8b, and the magnetic-pole pieces 9a and 9b, the protective cover 2a, and the magnetic sensor 4a. The wire rope flaw detector 1a further includes the magnetic sensor protecting members 6a and 6b. With the configuration described above, even when the protective cover 2a is deformed because of a large diameter of the wire rope 3 being the target to be measured and a large force to attract the wire rope 3 to the wire rope flaw detector, the clearance between the protective cover 2a and each of the magnetic sensor protecting members 6a and 6b can be made smaller than or equal to the clearance between the protective cover 2a and the magnetic sensor 4a.

As a result, the protective cover 2a, which is deformed, is first brought into contact with the magnetic sensor protecting members 6a and 6b before pressing the magnetic sensor 4a. Therefore, the risk of breakage of the magnetic sensor 4a due to the deformation of the protective cover 2a can be reduced.

Further, the protective cover 2a is not required to be increased in thickness or hardened. Therefore, a decrease in disconnection detection accuracy, which may be caused by increasing the thickness of the protective cover 2a, and a reduction in lifetime of the wire rope 3 itself, which may be caused by increasing the hardness of the protective cover 2a, can be prevented.

Even when only any one of the magnetic sensor protecting members 6a and 6b, specifically, the magnetic sensor protecting member 6a or the magnetic sensor protecting member 6b is provided, the effect of reducing the risk of breakage of the magnetic sensor 4a is obtained. When only any one of the magnetic sensor protecting members 6a and 6b is provided, however, the deformation of the protective cover 2a progresses in a region in which the magnetic sensor protecting member is not provided. As a result, the protective cover 2a is at a higher risk of being brought into contact with the magnetic sensor 4a to break the magnetic sensor 4a. Therefore, it is desired to arrange the magnetic sensor protecting members on both sides as in the case in which the magnetic sensor protecting members 6a and 6b are provided.

The definition of faces and a pressure are supplementarily described as follows with reference to FIG. 6. An upper face of the magnetic sensor 4a denotes a face of the magnetic sensor 4a, which is opposed to the protective cover 2a, on the sectional view of FIG. 6. A face of the protective cover 2a, which is located on a side opposite to a face on which the wire rope 3 passes, denotes a lower face of the protective cover 2a, which is opposed to the upper face of the magnetic sensor 4a on the sectional view of FIG. 6.

With the magnetic sensor protecting members 6a and 6b provided as illustrated in FIG. 6, a force of the lower face of the protective cover 2a to press the upper face of the magnetic sensor 4a can be reduced. Thus, application of a pressure equal to or larger than a predefined pressure (predetermined pressure) to the magnetic sensor 4a can be prevented.

The predetermined pressure herein corresponds to a design value that is set so as to enable the magnetic sensor 4a to ensure durability against the pressure to be applied. Through appropriate designing of the arrangement and thicknesses of the magnetic sensor protecting members 6a and 6b, the application of the pressure equal to or larger than the predetermined pressure to the magnetic sensor 4a can be prevented.

As described above, for the wire rope flaw detector according to the first embodiment, a configuration including the magnetic sensor protecting members is adopted. As a result, even under a state in which the ensured disconnection detection accuracy is achieved with the small thickness of the protective cover, the reduction in lifetime of the wire rope can be prevented because of the lower hardness of the contact face of the protective cover, which is to be brought into contact with the wire rope, than the hardness of the face layer of the wire rope. At the same time, the durability can be ensured by the prevention of the breakage of the magnetic sensor.

Through application of the wire rope flaw detector described above to a wire rope inspection for an elevator, the durability is improved. Thus, time required for maintenance such as repair and replacement can be significantly reduced to improve inspection efficiency. Further, the wire rope flaw detector can be mounted in the elevator in a constant manner. Thus, automation of the inspection can also be achieved.

Second Embodiment

Figure 7:
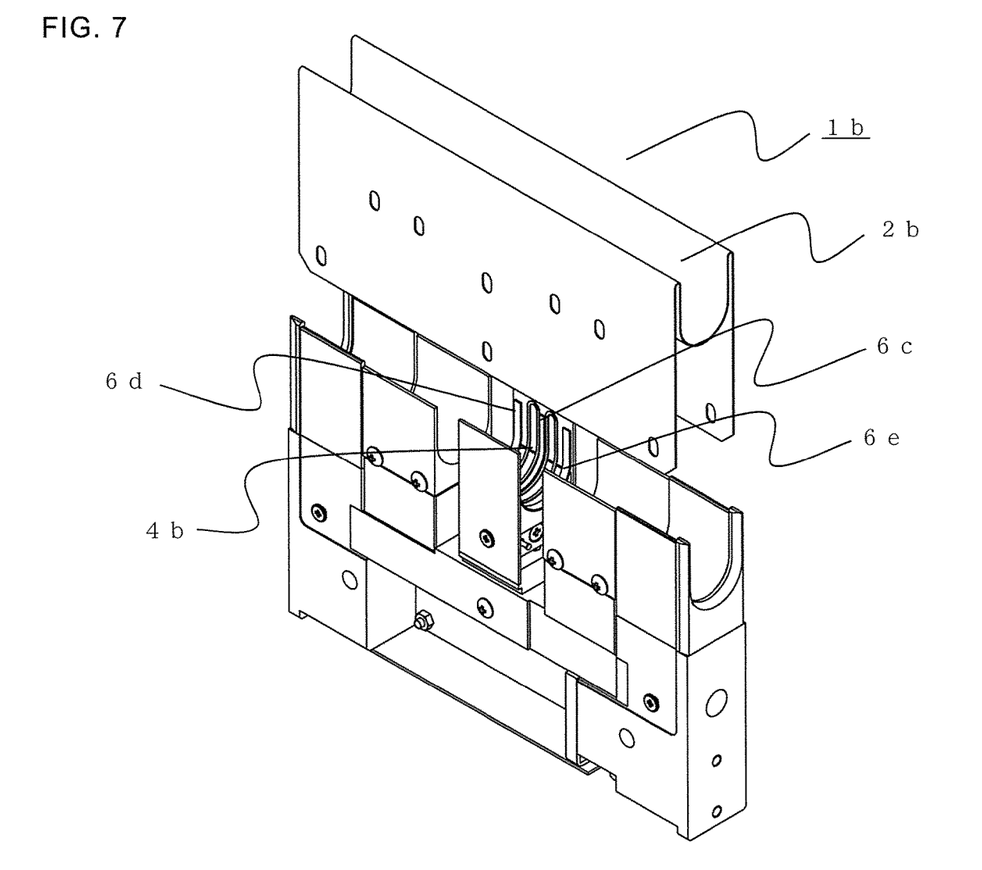
FIG. 7 is a perspective view for illustrating a state in which a protective cover of a wire rope flaw detector according to a second embodiment of the present invention is removed.

In a second embodiment of the present invention, a configuration including magnetic sensor protecting members 6c, 6d, and 6e in place of the magnetic sensor protecting members 6a and 6b of the first embodiment described above is described. FIG. 7 is a perspective view for illustrating a state in which a protective cover 2b of a wire rope flaw detector 1b according to the second embodiment of the present invention is removed.

In the second embodiment, there is considered a case in which a magnetic sensor 4b has a clearance therein as in the case of the wire rope flaw detector 1b illustrated in FIG. 7. More specifically, the magnetic sensor 4b has a clearance therein in the following cases.

The magnetic sensor 4b is formed of a plurality of coils, and has a clearance between the coils.

The magnetic sensor 4b is formed of a single coil, and the coil has a clearance inside.

The magnetic sensor 4b is formed of a plurality of Hall elements, and has a clearance between the Hall elements.

In the above-mentioned configuration of the magnetic sensor 4b, the magnetic sensor protecting members 6c and 6d are provided on both sides of the magnetic sensor 4b as in the first embodiment described above. Further, the magnetic sensor protecting member 6e can additionally be provided in the magnetic sensor 4b.

With the configuration described above, the deformation of the protective cover 2b can be supported at three positions corresponding to the magnetic sensor protecting members 6c, 6d, and 6e. In addition, a distance between the magnetic sensor protecting members 6c and 6d and a distance between the magnetic sensor protecting members 6d and 6e can be reduced. As a result, deflection of the protective cover 2b between the magnetic sensor protecting members 6c and 6d and between the magnetic sensor protecting members 6d and 6e can be reduced. Thus, the press on the magnetic sensor 4b due to the deformation of the protective cover 2b can be more reliably prevented.

As described above, for the wire rope flaw detector according to the second embodiment, the configuration including the magnetic sensor protecting members arranged at the three positions, specifically, on both sides of the magnetic sensor and inside the magnetic sensor is adopted. As a result, the press on the magnetic sensor due to the deformation of the protective cover can be more reliably prevented than in the first embodiment described above.

Even when only the magnetic sensor protecting member 6e inside the magnetic sensor 4 is provided as the magnetic sensor protecting member 6 and the magnetic sensor protecting members 6c and 6d, which are provided on both sides of the magnetic sensor, are eliminated, the press on the magnetic sensor 4b due to the deformation of the protective cover 2b can be prevented. In order to more reliably prevent the press, however, it is desired to arrange the magnetic sensor protecting members at all the three positions, specifically, on both sides of and inside the magnetic sensor.

Third Embodiment

In the first embodiment described above, the material of the magnetic sensor protecting members 6 has been described as the non-magnetic metal material such as aluminum, austenite-based stainless steel, or brass. The metal material has a larger Young's modulus than that of a resin material. Therefore, even when the protective cover 2 is deformed to press the magnetic sensor protecting members 6, the magnetic sensor protecting members 6 made of the metal material are less liable to be deformed. Thus, the magnetic sensor 4 can be more reliably protected.

Meanwhile, when the clearance between the protective cover 2 and the magnetic sensor 4 is large and therefore a difference in thickness between each of the magnetic sensor protecting members 6 and the magnetic sensor 4 can be increased, the metal material can be replaced by a resin material having a smaller Young's modulus as the material of the magnetic sensor protecting members 6.

The reason is as follows. Even when the magnetic sensor protecting members 6 are pressed by the protective cover 2 to be deformed to a certain extent, the protective cover 2 does not press the magnetic sensor 4 because of a large difference in thickness between the magnetic sensor 4 and each of the magnetic sensor protecting members 6.

With the configuration described above, the magnetic sensor protecting members 6 each made of a resin material having a small Young's modulus function as elastic members like springs. Therefore, even when the wire rope 3 presses the protective cover 2 with a strong force to bring the protective cover 2 into contact with the magnetic sensor protecting members 6, the magnetic sensor protecting members 6 are compressed to allow the protective cover 2 to be moved in a direction away from the wire rope 3.

As a result, a contact pressure that is received by the protective cover 2 from the wire rope 3 can be reduced. Therefore, an abrasion speed of the protective cover 2 can be decreased, and hence, durability can be improved.

As described above, for the wire rope flaw detector according to the third embodiment, when the magnetic sensor protecting members, each having such a thickness that the difference in thickness between each of the magnetic sensor protecting members and the magnetic sensor becomes larger than a preset defined value, are used, the configuration using the resin material as the material of the magnetic sensor protecting members is adopted. As a result, in comparison to the case in which the metal material is used as the material of the magnetic sensor protecting members, the abrasion speed of the protective cover can be decreased. Hence, the durability can be improved.

The third embodiment may be combined with the second embodiment described above so that the magnetic sensor protecting members made of the resin material are arranged inside the magnetic sensor. With the configuration described above, the effect of preventing the press on the magnetic sensor, which is obtained in the second embodiment described above, and the effect of improving the durability of the protective cover, which is obtained in the third embodiment, can be achieved at the same time.

Fourth Embodiment

In the third embodiment described above, the magnetic sensor protecting members 6 made of the resin material have been described. Meanwhile, in a fourth embodiment of the present invention, resin molding that is adopted in place of the resin material is described.

Figure 8:
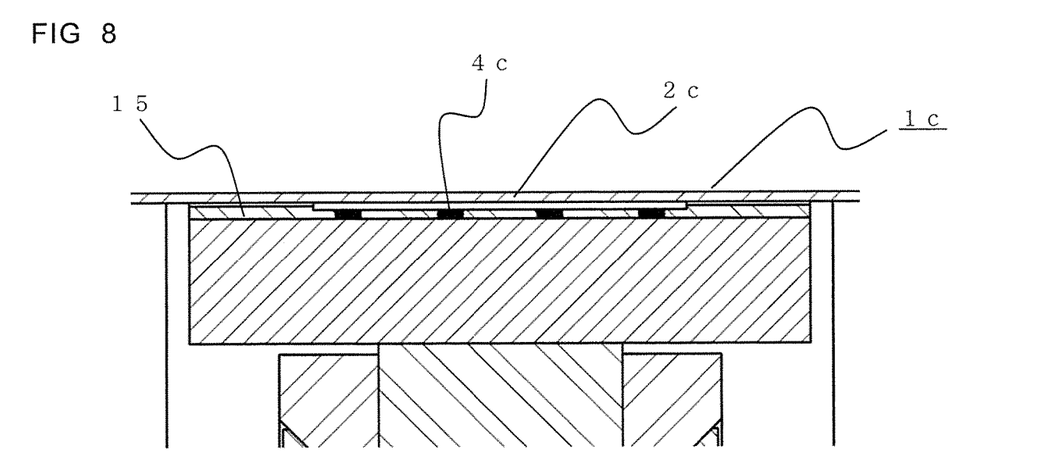
FIG. 8 is a sectional view for illustrating a magnetic sensor and the periphery thereof of a wire rope flaw detector according to a fourth embodiment of the present invention.

FIG. 8 is a sectional view of a magnetic sensor 4c and the periphery thereof of a wire rope flaw detector 1c according to the fourth embodiment of the present invention. In the fourth embodiment, as illustrated in FIG. 8, the magnetic sensor 4c is molded with a resin molding part 15.

When the above-mentioned configuration is adopted, a thickness of a region of the resin molding part 15, in which the magnetic sensor 4c is not present, is increased by a certain degree, whereas a thickness of a region of the resin molding part 15, in which the magnetic sensor 4c is present, is reduced by a certain degree, as a shape of the resin molding part 15. As a result, the same effects as those obtained in the case in which the magnetic sensor protecting members 6 made of the resin material in the third embodiment described above may be obtained.

When a thickness of the resin molding part 15 is set to the same thickness over the entire region regardless of the presence and absence of the magnetic sensor 4c, the magnetic sensor 4c is pressed by a protective cover 2c. With the presence of the resin molding part 15 therebetween, however, the risk of breakage of the magnetic sensor 4c due to the press of the protective cover 2c can be reduced.

As described above, for the wire rope flaw detector according to the fourth embodiment, the configuration in which the magnetic sensor is molded with the resin is adopted. As a result, the same effect as the effect of improving the durability of the protective cover, which is obtained in the third embodiment described above, may be obtained.

Fifth Embodiment

In the first to fourth embodiments described above, the magnetic sensor protecting members 6 made of the metal material or the resin material, or by the resin molding have been described. Meanwhile, in a fifth embodiment of the present invention, a ferromagnetic substance, which is adopted in place of the above-mentioned materials, is described.

Figure 9:
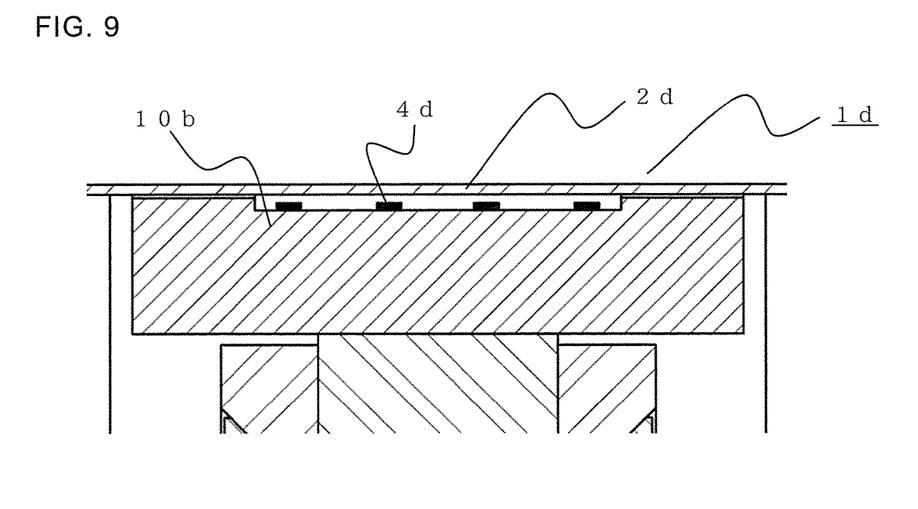
FIG. 9 is a sectional view for illustrating a magnetic sensor and the periphery thereof of a wire rope flaw detector according to a fifth embodiment of the present invention.

FIG. 9 is a sectional view of a magnetic sensor 4d and the periphery thereof of a wire rope flaw detector 1d according to the fifth embodiment of the present invention. The reason why a ferromagnetic substance is not used for the magnetic sensor protecting members 6 in the first to fourth embodiments described above is as follows. When the ferromagnetic substance is arranged in the vicinity of the magnetic sensor 4, the leakage magnetic flux, which is supposed to pass through the magnetic sensor 4, also passes through the ferromagnetic substance. Therefore, the disconnection detection accuracy may be decreased.

When the disconnection detection accuracy is high and has a tolerance, the magnetic sensor protecting members 6 can be made of a ferromagnetic substance. When the support base 10 is also made of a ferromagnetic substance, a support base 10b, which is formed as an integral structure of the support base 10 and the magnetic sensor protecting members 6, can also be adopted.

More specifically, protrusions, each having the same shape as that of each of the magnetic sensor protecting members 6 of FIG. 5 referred to above, are only required to be formed on a U-shaped portion of the support base 10b, as illustrated in FIG. 9. With the configuration described above, the number of components of the wire rope flaw detector can be reduced. Hence, manufacturing time can be reduced.

Further, a protective cover 2d, which is deformed, is first brought into contact with the portions of the support base 10b, which correspond to the magnetic sensor protecting members, before pressing the magnetic sensor 4d. Therefore, the risk of breakage of the magnetic sensor 4d due to the deformation of the protective cover 2d can be reduced.

As described above, for the wire rope flaw detector according to the fifth embodiment, the configuration in which the magnetic sensor protecting members are made of the ferromagnetic substance is adopted. As a result, the magnetic sensor protecting members can be formed to have the integral structure with other components. Thus, the effects of reducing the number of components and reducing the manufacturing time can be additionally achieved.

Sixth Embodiment

Figure 10:
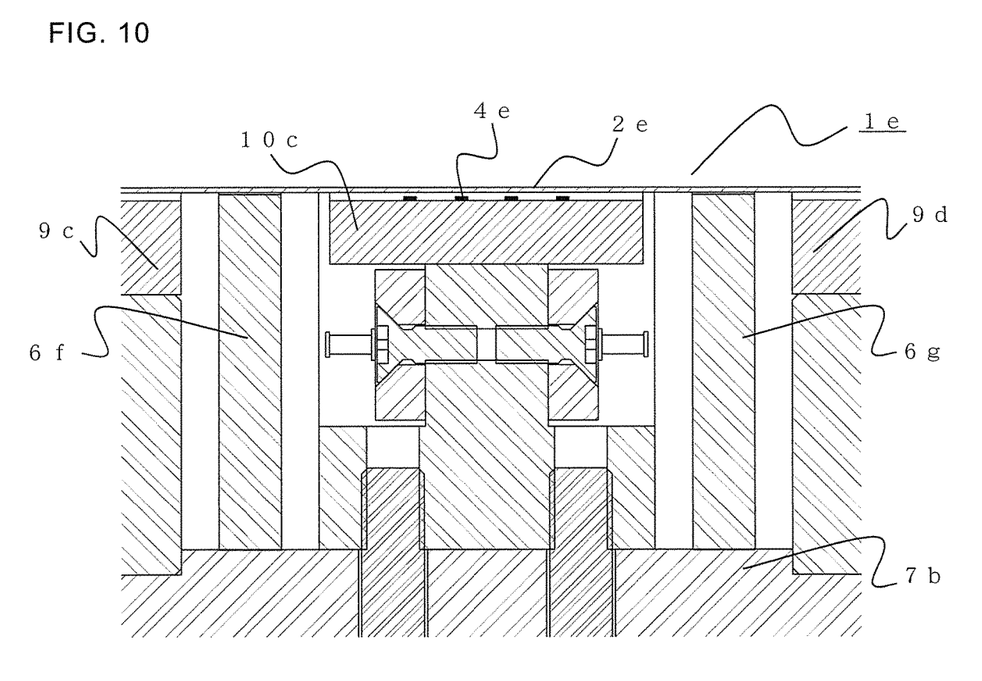
FIG. 10 is a sectional view for illustrating a magnetic sensor and the periphery thereof of a wire rope flaw detector according to a sixth embodiment of the present invention.

In a sixth embodiment of the present invention, the arrangement of the magnetic sensor protecting members 6 at locations other than on the support base 10 is described. FIG. 10 is a sectional view of a magnetic sensor 4e and the periphery thereof of a wire rope flaw detector 1e according to a sixth embodiment of the present invention.

In the first to fifth embodiments described above, the arrangement of the magnetic sensor protecting members 6 on the support base 10 has been described. However, the magnetic sensor protecting members 6 may also be arranged at locations other than on the support base 10. As illustrated in FIG. 10, magnetic sensor protecting members 6f and 6g may be provided so that the magnetic sensor protecting member 6f is located between a support base 10c and a magnetic-pole piece 9c and the magnetic sensor protecting member 6g is located between the support base 10c and a magnetic-pole piece 9d.

The magnetic sensor protecting members 6f and 6g in the sixth embodiment are mounted onto a back yoke 7b. A portion of each of the magnetic sensor protecting members 6f and 6g, which is located on the side opposite to the portion mounted to the back yoke 7b, is formed into a U-like shape in conformity with a shape of a protective cover 2e.

With the configuration described above, the magnetic sensor protecting members 6f and 6g are separated away from the magnetic sensor 4e. Therefore, a deformation amount of the protective cover 2e in the vicinity of the magnetic sensor 4e may be increased. As a result, the possibility that the magnetic sensor 4e may be pressed by the protective cover 2e is increased. However, the deformation of the protective cover 2e in the vicinity of the magnetic-pole pieces 9c and 9d can be reduced. Thus, durability of the entire protective cover 2e can be uniformly increased.

As described above, for the wire rope flaw detector according to the sixth embodiment, the configuration in which the magnetic sensor protecting members are arranged at the locations other than on the support base is adopted. As a result, the durability of the entire protective cover can be uniformly increased.

Seventh Embodiment

Figure 11:
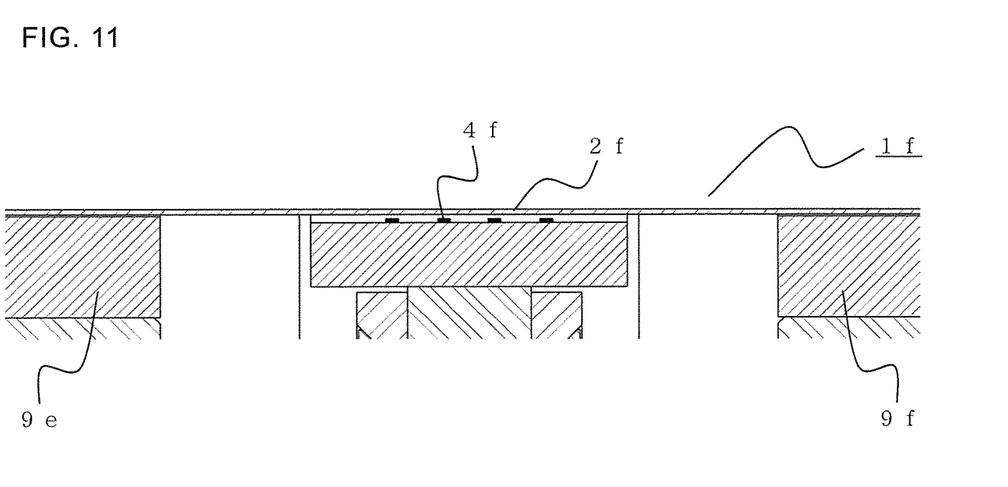
FIG. 11 is a sectional view for illustrating a magnetic sensor and the periphery thereof of a wire rope flaw detector according to a seventh embodiment of the present invention.

In a seventh embodiment of the present invention, a configuration different from that of the sixth embodiment described above is described as a specific example of the arrangement of the magnetic sensor protecting members 6 at the locations other than on the support base 10. FIG. 11 is a sectional view of a magnetic sensor 4f and the periphery thereof of a wire rope flaw detector 1f according to a seventh embodiment of the present invention.

In the sixth embodiment described above, there has been described the method of providing the magnetic sensor protecting members 6f and 6g not on the support base 10c but between the support base 10c and the magnetic-pole piece 9c and between the support base 10c and the magnetic-pole piece 9d, respectively. As illustrated in FIG. 11, however, the magnetic sensor protecting members may also be arranged at locations other than on the support base by providing the functions of the magnetic sensor protecting members to magnetic-pole pieces 9e and 9f.

More specifically, the magnetic sensor protecting member as illustrated in FIG. 5 referred to above can additionally be provided on a U-shaped portion of each of the magnetic-pole pieces 9e and 9f. Alternatively, a protrusion having the same shape as that of the magnetic sensor protecting member can be formed on each of the magnetic-pole pieces 9e and 9f, as illustrated in FIG. 11. By a method of setting each of a clearance between the magnetic-pole pieces 9e and 9f and a protective cover 2f equal to or smaller than a clearance between the protective cover 2f and the magnetic sensor 4f, breakage of the magnetic sensor 4f due to deformation of the protective cover 2f can be prevented as in the first to sixth embodiments described above.

With the configuration described above, in comparison to the sixth embodiment described above, the magnetic-pole pieces 9e and 9f, each having the function of the magnetic sensor protecting member, are arranged at positions farther away from the magnetic sensor 4f. Although a deformation amount of the protective cover 2f in the vicinity of the magnetic sensor 4f is increased to increase the possibility that the protective cover 2f may press the magnetic sensor 4f, additional components are not required. Thus, the manufacturing time can be reduced.

In addition, similarly to the sixth embodiment described above, the deformation of the protective cover 2f in the vicinity of the magnetic-pole pieces 9e and 9f can be reduced. Thus, durability of the entire protective cover 2f can be uniformly increased.

As described above, for the wire rope flaw detector according to the seventh embodiment, the configuration in which the functions of the magnetic sensor protecting members are provided to the magnetic-pole pieces so that the magnetic sensor protecting members are arranged at locations other than on the support base is adopted. As a result, the effects, specifically, the reduction in number of components and the reduction of manufacturing time can be additionally achieved. At the same time, the durability of the entire protective cover can be uniformly increased.

Eighth Embodiment

Figure 12:
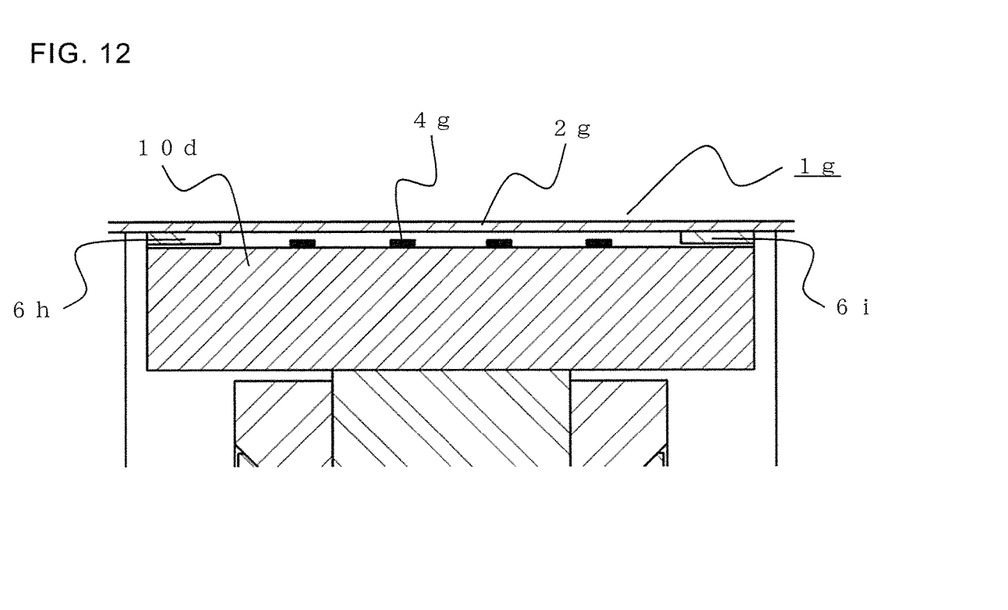
FIG. 12 is a sectional view for illustrating a magnetic sensor and the periphery thereof of a wire rope flaw detector according to an eighth embodiment of the present invention.

In an eighth embodiment of the present invention, a configuration different from those of the sixth and seventh embodiments described above is described as a specific example of the arrangement of the magnetic sensor protecting members 6 at the locations other than on the support base 10. FIG. 12 is a sectional view of a magnetic sensor 4g and the periphery thereof of a wire rope flaw detector 1g according to the eighth embodiment of the present invention.

Magnetic sensor protecting members 6h and 6i in the eighth embodiment are provided not on a support base 10d but on a protective cover 2g. In this case, a thickness of each of the magnetic sensor protecting members 6h and 6i is only required to be set so that a clearance between the magnetic sensor protecting members 6h and 6i and the support base 10d becomes equal to or smaller than a clearance between the protective cover 2g and the magnetic sensor 4g. With the configuration described above, the risk of breakage of the magnetic sensor 4g due to the press of the protective cover 2g can be reduced as in the first to seventh embodiments.

As described above, for the wire rope flaw detector according to the eighth embodiment, the configuration in which the functions of the magnetic sensor protecting members are provided to the protective cover side so that the magnetic sensor protecting members are arranged at locations other than on the support base is adopted. Even with the configuration described above, the risk of breakage of the magnetic sensor can be reduced as in the first to sixth embodiments described above.

REFERENCE SIGNS LIST 1a to 1g wire rope flaw detector, 2a to 2g protective cover, 3 wire rope, 4a to 4g magnetic sensor, 5 guide groove, 6a to 6i magnetic sensor protecting member, 7a, 7b back yoke, 8a, 8b permanent magnet, 9a to 9f magnetic-pole piece, 10a to 10d support base, 11 non-magnetic material part, 12 wire rope damaged portion, 13 local leakage magnetic flux, 14a, 14b guide block, 15 resin molding part

The invention claimed is:

1. A wire rope flaw detector configured to detect damage of a wire rope, comprising:
a magnetizer configured to form a magnetic path in a predetermined segment of the wire rope;
a magnetic sensor, which is arranged so as to be magnetically insulated from the magnetizer, and is configured to detect a leakage magnetic flux generated from the magnetic path formed in the wire rope;
a protective cover, which is provided between the magnetic sensor and the wire rope, has a groove for allowing the wire rope to pass therethrough, and has one face that is located on a side opposite to another face on a side on which the wire rope passes, the one face having a part maintained at such a position that the part of the one face is opposed to an upper face of the magnetic sensor; and
a magnetic sensor protecting member which is provided on the lower face side of the protective cover and which has a thickness such that a pressure applied from the protective cover to the magnetic sensor is less than a predetermined value,
wherein a gap between the protective cover and the magnetic sensor protecting member is smaller than a gap between the protective cover and the magnetic sensor and is a positive value,
wherein the protective cover is configured to be first brought into direct contact with the magnetic sensor protecting member before pressing the magnetic sensor when the protective cover is deformed.

2. The wire rope flaw detector according to claim 1, wherein the magnetic sensor protecting member comprises first and second magnetic sensor protecting members arranged at least at one position on each of two sides of the magnetic sensor in an axial direction of the wire rope.

3. The wire rope flaw detector according to claim 1, wherein the magnetic sensor protecting member is arranged in a clearance inside the magnetic sensor in an axial direction of the wire rope.

4. The wire rope flaw detector according to claim 2, wherein the magnetic sensor protecting member is arranged in a clearance inside the magnetic sensor in an axial direction of the wire rope.

5. The wire rope flaw detector according to claim 1, further comprising a support base, which is magnetically insulated from the magnetizer, and on which the magnetic sensor is arranged,
wherein the magnetic sensor protecting member is arranged on the support base.

6. The wire rope flaw detector according to claim 2, further comprising a support base, which is magnetically insulated from the magnetizer, and on which the magnetic sensor is arranged,
wherein the magnetic sensor protecting member is arranged on the support base.

7. The wire rope flaw detector according to claim 3, further comprising a support base, which is magnetically insulated from the magnetizer, and on which the magnetic sensor is arranged,
wherein the magnetic sensor protecting member is arranged on the support base.

8. The wire rope flaw detector according to claim 4, further comprising a support base, which is magnetically insulated from the magnetizer, and on which the magnetic sensor is arranged,
wherein the magnetic sensor protecting member is arranged on the support base.

9. The wire rope flaw detector according to claim 1, wherein the magnetic sensor protecting member is arranged in the magnetizer.

10. The wire rope flaw detector according to claim 2, wherein the magnetic sensor protecting member is arranged in the magnetizer.

11. The wire rope flaw detector according to claim 3, wherein the magnetic sensor protecting member is arranged in the magnetizer.

12. The wire rope flaw detector according to claim 4, wherein the magnetic sensor protecting member is arranged in the magnetizer.

13. The wire rope flaw detector according to claim 1, wherein the magnetic sensor protecting member is arranged in the protective cover.

14. The wire rope flaw detector according to claim 2, wherein the magnetic sensor protecting member is arranged in the protective cover.

15. The wire rope flaw detector according to claim 3, wherein the magnetic sensor protecting member is arranged in the protective cover.

16. The wire rope flaw detector according to claim 1, wherein the magnetic sensor protecting member is made of a non-magnetic metal material.

17. The wire rope flaw detector according to claim 1, wherein the magnetic sensor protecting member is made of a resin material.

18. The wire rope flaw detector according to claim 1, wherein the magnetic sensor protecting member is made of a magnetic substance.

19. The wire rope flaw detector according to claim 1, further comprising guide blocks fixed at each end of the magnetizer in an axial direction of the wire rope,
- wherein both ends of the protective cover are fixed to the guide block, and
- wherein the magnetic sensor protection member is provided in the axial direction of the wire rope, between the two ends of the magnetizer to which the guide block is fixed.

20. A wire rope flaw detector configured to detect damage of a wire rope, comprising:
- a magnetizer configured to form a magnetic path in a predetermined segment of the wire rope;
- a magnetic sensor, which is arranged so as to be magnetically insulated from the magnetizer, and is configured to detect a leakage magnetic flux generated from the magnetic path formed in the wire rope;
- a protective cover, which is provided between the magnetic sensor and the wire rope, has a groove for allowing the wire rope to pass therethrough, and has one face that is located on a side opposite to another face on a side on which the wire rope passes, the one face having a part maintained at such a position that the part of the one face is opposed to an upper face of the magnetic sensor; and
- a magnetic sensor protecting member which is provided on the lower face side of the protective cover and which has a thickness such that a pressure applied from the protective cover to the magnetic sensor is less than a predetermined value, and
- a support base, which is magnetically insulated from the magnetizer, and on which the magnetic sensor is arranged,
- wherein a gap between the support base and the magnetic sensor protecting member is smaller than a gap between the protective cover and the magnetic sensor and is a positive value,
- wherein the magnetic sensor protecting member is configured to be first brought into direct contact with the support base before pressing the magnetic sensor when the protective cover is deformed.

* * * * *